(12) United States Patent
Callender et al.

(10) Patent No.: US 8,331,261 B2
(45) Date of Patent: Dec. 11, 2012

(54) TEST METHOD FOR TYPE 3I RECEIVER IN MULTICARRIER CONFIGURATION

(75) Inventors: Christopher P. Callender, Fleet (GB); Tao Chen, Salo (FI)

(73) Assignee: Renesas Mobile Corporation, Tokyo (JP)

( * ) Notice: Subject to any disclaimer, the term of this patent is extended or adjusted under 35 U.S.C. 154(b) by 221 days.

(21) Appl. No.: 12/987,277

(22) Filed: Jan. 10, 2011

(65) Prior Publication Data

US 2012/0176919 A1    Jul. 12, 2012

(51) Int. Cl.
*H04B 7/216* (2006.01)
(52) U.S. Cl. ........ 370/252; 370/310; 370/328; 370/329; 370/335; 455/403; 455/422.1
(58) Field of Classification Search .................. 370/241, 370/252, 310–350; 455/403, 422.1–466
See application file for complete search history.

(56) References Cited

U.S. PATENT DOCUMENTS

| 2011/0076999 A1* | 3/2011 | Kazmi et al. | 455/423 |
| 2012/0147856 A1* | 6/2012 | Kazmi et al. | 370/332 |

FOREIGN PATENT DOCUMENTS

| EP | 1858180 A1 | 11/2007 |
| GB | 2464289 A | 4/2010 |

OTHER PUBLICATIONS

Petrov et al, Overview of Single Frequency Multipoint Transmission Concepts for HSDPA and Performance Evaluation of Intra-site Multiflow Aggregation Scheme, Vehicle Technology Conference, May 2012.*
3GPP TR 25.963 V9.0.0 (Dec. 2009), "3$^{rd}$ Generation Partnership Project; Technical Specification Group Radio Access Network; Feasibility study on interference cancellation for UTRA FDD User Equipment (UE) (Release 9)", 69 pgs.
R5-104591, 3GPP TSG RAN WG R5 Meeting #48, Madrid, Spain Aug. 23-27, 2010, "DC-HSDPA Type 3i test cases: proposal for simplification", Rohde & Schwarz, 4 pgs.
International Search Report for corresponding International Patent Application No. PCT/EP2012/050199 mailed Mar. 30, 2012.

(Continued)

*Primary Examiner* — Charles C Jiang
(74) *Attorney, Agent, or Firm* — Lucas & Mercanti LLP; Robert P. Michal

(57) ABSTRACT

The present invention discloses a test method and a testing apparatus for type 3i receivers which use multicarrier operation in HSDPA. The method sequentially tests each carrier, one at a time. Applying multi-switches, channel emulators and efficient wirings, performance tests can be performed without any need for changing the User Equipment to be tested. In case a single carrier test is passed, the next carrier is selected for the test. All carriers are thus tested sequentially against a single carrier throughput requirement until all carriers have been processed.

19 Claims, 3 Drawing Sheets

OTHER PUBLICATIONS

Ericsson, et al.; "On the complexity of type 3i DC-HSDPA testing", 3GPP Draft; R4-104436J/2,3$^{RD}$ Generation Partnership Project (3GPP), Mobile Competence Centre;650, Route Des Lucioles; F-G6921 Sophia-Antipolis Cedex; France, vol. RAN WG4, no. Jacksonville; 20101115, Nov. 9, 2010 (3 pages).

ST-Ericsson/Ericsson: "MC-HSDPA testing complexity (DC-HSDPA type 31, DB-DC-HSDPA and 4C- HSDPA)", 3GPP Draft; R4-111216-4C-Perf_Discussion_R4, 3$^{RD}$ Generation Partnership Project (3GPP), Mobile Competence Centre; 650, Route Des Lucioles; F-06921 Sophia-Antipolis Cedex; France, vol. RAN WG4, no. Taipei, Taiwan; 20110221, Feb. 17, 2011 (8 pages).

Qualcomm Incorporated: "Completion of UE demodulation performance requirements for 4C-HSDPA" 3GPP Draft; R4-113511_UE_DEMOD-4C_HSDPA, 3$^{rd}$ Generation Partnership Project (3GPP), Mobile Competence Centre; 650, Route Des Lucioles; F-06921 Sophia-Antipolis Cedex; France, vol. RAN WG4, no. Roma; 20110627, Jun. 22, 2011 (58 pages).

EP Combined Search and Examination Report under Sections 17 and 18(3) issued for corresponding GB Patent Application No. GB1117048.7 mailed Feb. 2, 2012.

* cited by examiner

TEST METHOD FOR TYPE 3I RECEIVER IN MULTICARRIER CONFIGURATION

BACKGROUND OF THE INVENTION

1. Field of the Invention

The present invention relates to mobile communication networks, and especially to performance testing in mobile communication networks, for example with 3GPP multicarrier High-Speed Downlink Packet Access User Equipment.

2. Description of the Related Art

The evolution of cellular wireless communication systems has been marked with different generations. $1^{st}$ generation (1G) included analog systems such as AMPS (Advanced Mobile Phone System) and NMT (Nordic Mobile Telephone) cellular phone networks, introduced in the early 1980s. The second generation (2G) introduced digital cellular telephony such as the GSM (Global System for Mobile Communications) standard, introduced in the early 1990s, which was standardized by the European Telecommunication Standards Institute (ETSI). GSM applies Time Division Multiple Access (TDMA) based radio interface. GSM is still the most widespread standard used in mobile communications.

After the 2G networks, $3^{rd}$ Generation Partnership Project (3GPP) has standardized globally applicable system specification for $3^{rd}$ generation mobile communication system. An example of such a system is a Universal Mobile Telecommunications System (UMTS) which applies Wideband Code Division Multiple Access (WCDMA) in its air interface. Original chip rate in WCDMA was specified as 3.84 Mcps and the nominal carrier spacing as 5 MHz. In 3GPP release 5, the concept of High-Speed Downlink Packet Access (HSDPA) has been introduced. It is an enhanced communications protocol in the High-Speed Packet Access family which allows higher data transfer speeds and capacity. With HSPDA, data rates up to 4 Mbps for packet switched data are supported. HSPA+ or "Evolved High-Speed Packet Access" is a subsequent wireless broadband standard, and it was defined in release 7. HSPA+ provides further increase in data rates by using higher order modulation methods (such as 64QAM) and by using multiple antenna techniques such as "multiple-input multiple-output" (MIMO) which means employing several antennas both in the transmitter and the receiver.

In release 8, a concept of Long Term Evolution (3GPP LTE) was introduced. Instead of the earlier WCDMA based radio access technology, Orthogonal Frequency Division Multiplexing (OFDM) is applied in LTE. Also, a dual cell HSDPA (DC-HSDPA) is introduced in release 8 which enables a single user equipment (UE) to receive on two adjacent carriers. Dual cell HSDPA is based on a primary and secondary carriers where the primary carrier provides all downlink physical channels together with channels supporting the uplink data transmission, comprising e.g. a first set of High Speed Physical Downlink Shared Channels (HS-PDSCHs) and High Speed Shared Control Channels (HS-SCCHs). The secondary carrier is responsible for transmitting a second set of HS-PDSCHs and HS-SCCHs. Release 8 allows data rate around 42 Mbps when dual cell functionality is used with 64QAM modulation.

Release 9 combined the dual cell HSDPA with MIMO functionality and also extends the dual cell approach to uplink direction. Furthermore, the used carriers may locate in two separate bands for downlink transmission, providing a dual band HSDPA (DB-HSDPA) operation. Bands can be distant, e.g. dual band configuration no 1 in release 9 is specified to represent downlink bands 925-960 MHz and 2110-2170 MHz. This aspect has great effect on planning the UE's RF parts so that the receiver is able to receive in these two bands simultaneously.

Release 9 has further been developed to a standard named as LTE Advanced, represented by release 10 and fulfilling all $4^{th}$ generation system requirements. The LTE architecture comprises an Evolved UMTS Radio Access Network, abbreviated by E-UTRAN. Release 10 specifies for HSDPA a use of three or four carriers in the downlink direction. This means the UE can receive on four adjacent carriers each having a 5 MHz band. It will provide even higher data rates; with MIMO this approach makes possible data rates up to 168 Mbps.

3GPP has also specified different release-independent performance requirements for UEs applying the HSDPA. Interference aware receivers are marked with an additional "i"; thus, type 3 is for instance a diversity equalizer and type 3i represents a diversity equalizer with interference awareness. The type 3i receiver takes into account not only the interference arising from users in the serving cell but also the notable interference arising from the other (usually neighbouring) cells.

For example, specification 3GPP TR 25.963 (V9.0.0) discusses a feasibility study on interference cancellation for UTRA FDD User Equipment. It includes general simulation configurations with different type of receivers, interference models and several other parameters for HSDPA traffic, and also it covers type 3i receivers.

There have been discussed test configurations for type 3i receivers where dual cell HSDPA is used. The receiving properties of the receiver with an equalizer, affected by different radio channel conditions, are needed to be tested with a test setup. One such setup is shown in document R5-104591 "DC-HSDPA Type 3i test cases: proposal for simplification", 3GPP TSG RAN WG R5 Meeting #48, 23-27 Aug. 2010; page 3. This is also shown in FIG. 1. The test setup includes two wanted TX sources 1 and 2 (10a and 10b). Source 1 has carrier frequency $f_1$ and source 2 has carrier frequency $f_2$ which is adjacent with $f_1$. The bandwidth for each carrier is here 5 MHz. A diversity antenna is used, which is shown with two antenna ports (marked Rx) in the UE 17 under test. For the test procedure with antenna diversity, the source signals need to be fed into simulated radio channels 13 but these channels need to have uncorrelated fading with each other. Type 3i receiver requirements include the use of three cells for a single carrier. This can be seen in FIG. 1 by a wanted signal and two interfering signals in both sources. Tx signals are each fed through splitters 11 into an attenuator-fader (12, 13) combination which presents a radio channel which is further uncorrelated with the other radio channels. White noise must also be modelled and fed into the simulation. This is done by Additional White Gaussian Noise (AWGN) blocks 14 fed through respective attenuators 12. Different wanted and interference signal branches are combined through couplers (or "HYB") 15 and through a directional coupler 16 according to the wirings of FIG. 1. The diversity antenna branches of the UE 17 receive the combined RX signals which are then examined. The other signal direction (uplink) where the UE transmits data, is represented by the directional coupler 16, the lower-most attenuator 12 and the Rx port in the second signal source 10b.

It is significant that in order to create this test scenario, twelve fader blocks (=channel emulators) and fifteen attenuator blocks are required in order to test the RX properties against DC-HSDPA requirements of the type 3i receivers.

The above mentioned prior art, document R5-104591 mentions an enhanced solution (see page 4 of the document) which depicts the use of six fading channel emulators. It combines each of the similar TX signal types together (e.g. interferer no 1 in the first frequency with the interferer no 1 in the second frequency), directs those signals into two separate faders (bandwidth is 10 MHz), and the resulting components are combined with couplers and added noise (AWGN) to two RX antenna ports. This solution is a little bit simpler than the earlier solution. The problem of this solution which is also mentioned in the document itself is that the fading profiles originally designed for 5 MHz bandwidth are now extended to a 10 MHz bandwidth. Therefore, unwanted periodicity will occur in time domain. Some extension for the 5 MHz bandwidth channel model would thus be needed. Also, it is notable that because of the 10 MHz bandwidth faders, the test setup according to R5-104591 is not applicable to cases where carriers are not configured on adjacent frequencies, such as in dual band dual cell HSDPA systems (DB-DC-HSDPA), see above.

Considering release 10 and its four adjacent downlink carriers in up to two separate bands, in other words in "4C-HSDPA", 24 pieces of channel emulator blocks are needed, together with 8 pieces of AWGN blocks. Finally, considering the latest 3GPP release 11 concentrating on advanced IP interconnection of services, it would introduce the use of up to eight downlink carriers, thus called as "8C-HSDPA". This scenario would need 48 fading channel emulators to be used in the performance testing of type 3i receivers.

Due to the above mentioned issues, the inevitable problem of the prior art is complexity of the test equipment which is even emphasized in more sophisticated requirements of the latest 3GPP releases. This also increases the costs of the testing equipment, thus making the prior art approaches very expensive and thus, not sustainable. Therefore, there is an obvious need for simplifying the environment used for the performance testing.

SUMMARY OF THE INVENTION

According to one aspect of the invention there is provided a testing method. The testing method comprises establishing a connection between a transmitter and a receiver with at least two carriers; introducing interference from at least one neighboring cell to each of the at least two carriers; selecting one of the at least two carriers and a set of fading channel emulators for a measurement; measuring at least one received signal characteristic on the selected carrier after fading; switching to an unselected one of the at least two carriers for a measurement and selecting a set of fading channel emulators for a measurement; and proceeding with the above measuring, switching and selecting steps until all of the at least two carriers of the established connection have been measured.

In one embodiment, the testing method further comprises switching between the at least two carriers sequentially or at random order.

In one embodiment, the testing method further comprises emulating noise in the radio channel by adding white noise before the measuring step.

In one embodiment, switching to an other set of fading channel emulators in case the selected carrier locates in other frequency band.

In one embodiment, the characteristic is a data throughput against a type 3i receiver requirement of the $3^{rd}$ Generation Partnership Project (3GPP) specifications.

In one embodiment, the testing method further comprises outputting a test pass mark if the requirement is met for the selected carrier; or outputting a test failed mark if the requirement is not met for the selected carrier.

In one embodiment, the testing method further comprises deeming an overall test outcome to be a pass result if test pass marks are output for all configured carriers; or deeming the overall test outcome to be a fail result if a test fail mark is output for any configured carrier.

In one embodiment, the testing method further comprises checking Acknowledgement (ACK/NACK) messages of Hybrid Automatic Repeat Request (HARQ) in order to identify carrier data of transmitted packets.

In one embodiment, the testing method further comprises introducing interference from two neighboring cells to each of the at least two carriers.

In one embodiment, the established connection is a multi-cell, multi-band High-Speed Downlink Packet Access connection.

According to another aspect of the invention, there is provided a testing apparatus. The testing apparatus comprises a transmitter and a receiver configured to establish a connection with at least two carriers; at least one interference source configured to introduce interference from at least one neighboring cell to each of the at least two carriers; at least one set of fading channel emulators; and a set of switches, enabling a set of fading channel emulators among the at least one set of fading channel emulators to be connected to a single selected carrier at a time, for a measurement of at least one received signal characteristic on the selected carrier after fading, further proceeding until all of the at least two carriers of the established connection have been measured.

In one embodiment, six fading channel emulators in connection with transmitted signals of the selected carrier are used during a single measurement phase.

In one embodiment, transmitted signals regarding unselected carriers are directly fed to the receiver without fading during a single measurement phase.

In one embodiment, the testing apparatus further comprises at least one additional white Gaussian noise module to emulate the noise in the radio channel.

In one embodiment, two fading channel emulators are used for a wanted signal, further two fading channel emulators are used for a first interference source from a first neighboring cell, and further two fading channel emulators are used for a second interference source from a second neighboring cell.

In one embodiment, a fading channel of a first antenna branch of the receiver is independent of a fading channel of a second antenna branch of the receiver during all measurement phases.

In one embodiment, the testing apparatus further comprises a control unit for controlling at least one of connection establishing, the at least one interference source, the at least one set of fading channel emulators, the set of switches and the measurements.

In one embodiment, the testing apparatus is implemented in at least one separate or embedded hardware module usable for an existing testing device.

According to another aspect of the invention, there is provided a computer program comprising code adapted to perform the following steps, when executed on a data-processing system: establishing a connection between a transmitter and a receiver with at least two carriers; introducing interference from at least one neighboring cell to each of the at least two carriers; selecting one of the at least two carriers and a set of fading channel emulators for a measurement; measuring at least one received signal characteristic on the selected carrier after fading; switching to an unselected one of the at least two carriers for a measurement and selecting a set of fading channel emulators for a measurement; and proceeding with the above measuring, switching and selecting steps until all of the at least two carriers of the established connection have been measured.

In one embodiment, the computer program is stored on a computer readable medium.

It is possible to combine one or more of the embodiments and aspects disclosed above to form one or more further embodiments of the present invention.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. The examples shown in the drawings are not the only possible embodiments of the invention and the invention is not considered to be limited to the presented embodiments. In the drawings.

DETAILED DESCRIPTION OF THE EMBODIMENTS

Reference will now be made in detail to the embodiments of the present invention, examples of which are illustrated in the accompanying drawings.

The present invention handles performance testing for 3GPP User Equipment in multicarrier configuration.

Figure 1:
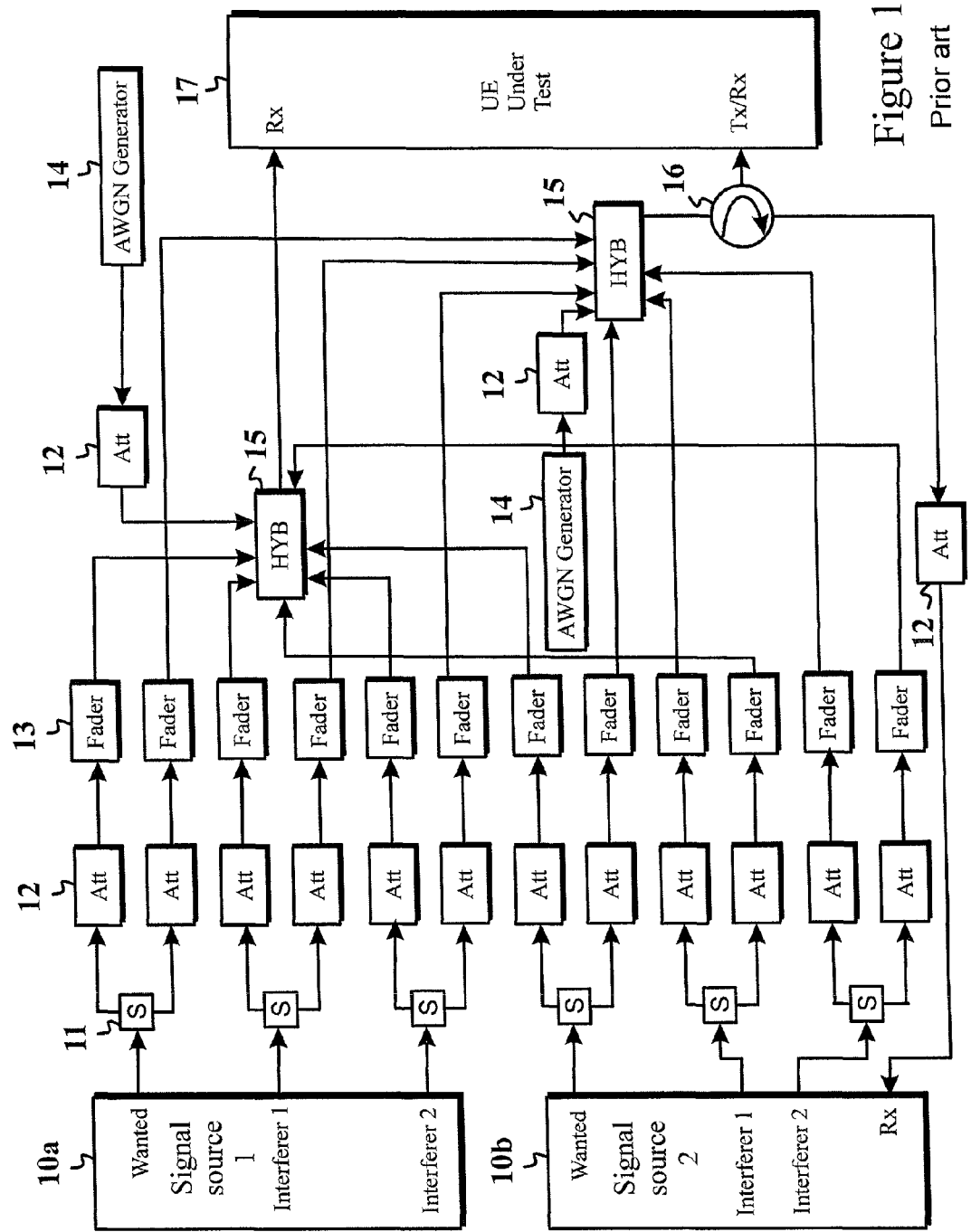
FIG. 1 is a block diagram illustrating a prior art solution of a connection diagram for dual cell HSDPA type 3i receiver performance testing.

Considering current requirements for all demodulation tests of an UE with multicarrier operation, it is notable that they are based on scaling the throughput requirement for a single carrier. In other words, in case the requirement for a single carrier throughput is R kbps, then the corresponding throughput requirement for dual carrier operation is 2R. This principle allows using the same testing techniques for both the single and dual carrier configurations. However, by building the testing module as in FIG. 1, we see that with greater number of carriers the configuration will be severely complex and expensive. This is particularly true in validating the type 3i receivers.

Furthermore, considering a basic property of HSDPA based data transport, Hybrid Automatic Repeat Request, HARQ, is a combination of Forward Error Correaction (FEC) coding and error detection. Redundant bits are added to the data stream and with an appropriate error correction method, some errors due to radio channel quality can be corrected. However, in case of bad channel quality, typically not all errors can be corrected by this way, and therefore the corrupted packet needs to be retransmitted. Earlier corrupted packet can also be saved in the receiver, and it can be used together with the retransmitted packet in order to create an error-free packet. HARQ message is therefore a message from base station to the UE regarding a certain carrier, and a corresponding acknowledgement message ACK (or NACK, "negative ACK") is created by the UE when receiving the retransmission successfully (or non-successfully).

The present invention uses the HARQ messaging in multicarrier transmission so that when the ACK message is sent by the UE as a response to the HARQ retransmission, the test system can determine which downlink carrier the HARQ message relates to. At this basis, regardless of how many carriers are used (etc. 2, 4 or 8), the test system is able to measure a throughput per a single carrier by checking the amount of sent ACK or NACK messages relating to the transmissions on a particular carrier.

Figure 2:
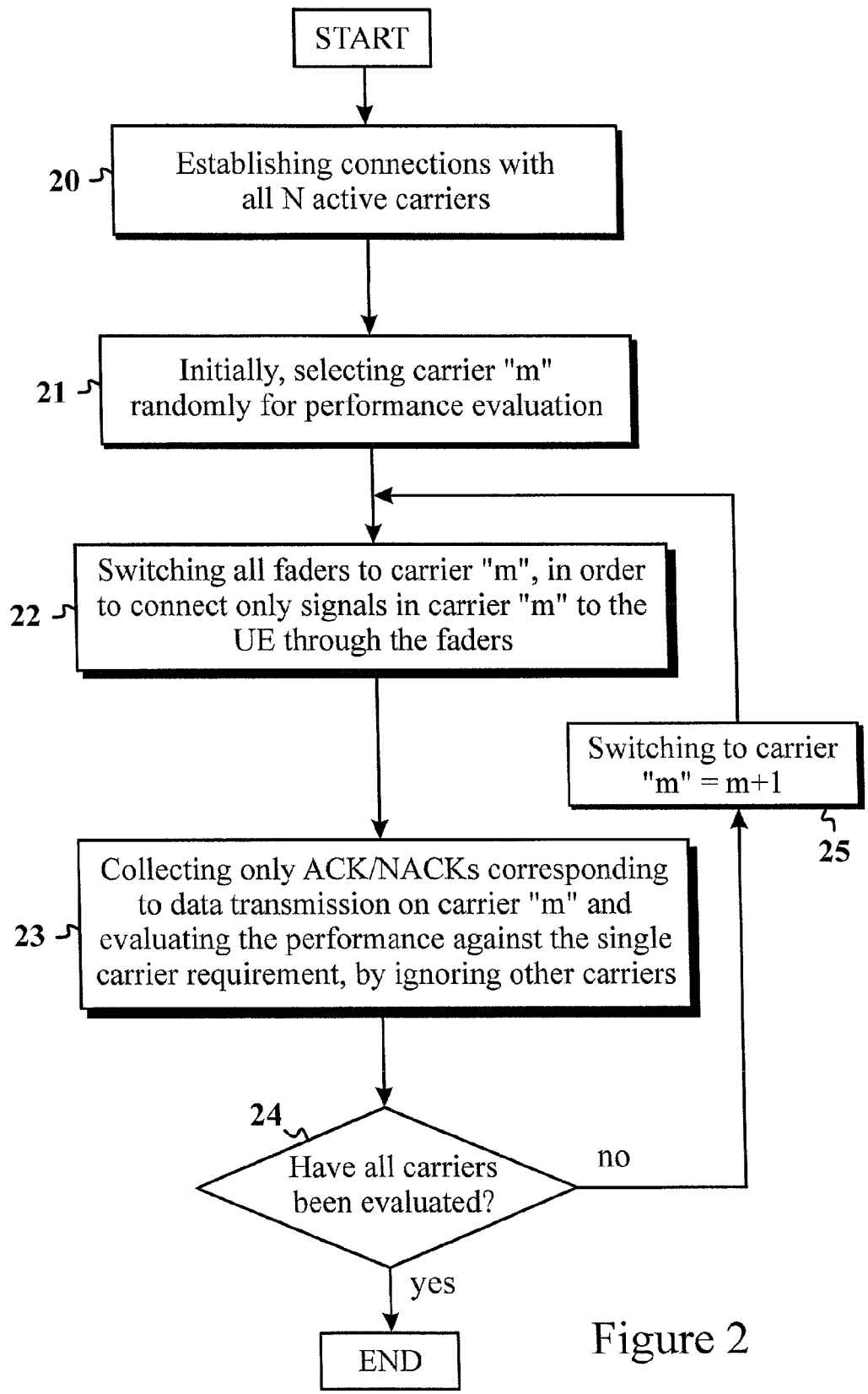
FIG. 2 is one embodiment of a test procedure according to the invention.

In the following, an embodiment of a test procedure according to the invention is presented. We refer now to FIG. 2. Generally, we consider a dual carrier or multicarrier (e.g. four or eight carriers) usage with a type 3i receiver, which uses the HSDPA protocol. Still, also uplink direction or some other protocol or technology may be used in the invention if the multicarrier requirement is otherwise fulfilled. At a first step of the procedure, connections are established with all N active carriers 20. All available carriers are thus activated with the connections. Also, interference from neighboring cells (in an embodiment, from two neighboring cells) is initially added for each carrier. In an embodiment, all the signals are specified in a 5 MHz bandwidth. We may say that in the simplest implementation embodiment of the invention, the dual cell embodiment, two wanted signal sources with frequencies $f_1$ and $f_2$ and with bandwidths of 5 MHz are placed as TX signal sources for the performance evaluation. With even more carriers than two, the principle is the same, adding a further TX signal source for the test procedure. N can be any integer value equal or over "2".

At the following step, we initially select a first carrier, "m", for performance evaluation 21. This may be selected randomly among all the carriers.

After that step, the test device switches all faders (channel emulators) to carrier "m", in order to connect only signals in carrier "m" to the User Equipment through the faders 22. In other words, we let the wanted and interference signals on carrier "m" propagate through the channel emulators (discussed later) and also noise is introduced in the test environment in the form of AWGN. The signals of the other carriers are at this stage connected directly to the UE without channel emulators.

At the following step 23, the test device will collect only ACK/NACK messages corresponding to data transmission on carrier "m", and furthermore, evaluate the performance against a single carrier requirement. Other carriers are ignored at this stage which means that the ACK/NACKs regarding the other carriers are not taken into account in the performance evaluation of carrier "m". In an embodiment, throughput or an other desired characteristic is measured by the test device during the performance evaluation. For this stage, the type 3i requirements for a single carrier have been loaded for the test device in order to check the measured throughput against the required throughput. By checking the amount of ACK or NACK messages for the HARQ retransmissions, the test device makes sure that the achieved throughput is correctly measured and comprises only the packets sent through the single carrier "m" in consideration at that time. All other acknowledgement messages indicating packets sent through other carriers are neglected at this evaluation phase 23.

At the following, it is checked, whether all the carriers have already been tested 24. In case there are still untested carriers, the test device switches to a next carrier "m"=m+1 in step 25.

After the switching step 25, the same procedure as above, steps 22-24 are reperformed for the new carrier "m=m+1" and against the same single carrier throughput requirement. However, switching between carriers may be done either sequentially or in random order.

When all the carriers (N) have been selected and evaluated in the step loop 22-25, the test procedure can be finished after step 24. The principle is applied the same way independent of whether a 2C, 4C, 8C or even some other multicarrier system is tested. One set of faders can be applied, unless the applied carriers locate in two non-adjacent frequency bands, when several sets of faders may be used. Generally, in such an embodiment, one set of faders per frequency band (see also description of FIG. 3) can be used in multiband operation such as in 4C-HSDPA.

In one embodiment according to the invention, after the measurement 23 of the selected carrier, a test pass mark is output if the requirement is met for the selected carrier; or a test failed mark is output if the requirement is not met for the selected carrier. This can be implemented by an appropriate signalling output, e.g. by a LED light signal showing the achieved result.

Furthermore, the system can deem an overall test outcome to be a pass result if test pass marks are output for all configured carriers. Also, the system can deem the overall test outcome to be a fail result if a test fail mark is output for any configured carrier. The test failed mark or the overall fail result may lead into changing some parameters in the configuration and re-evaluating the new configuration.

Figure 3:
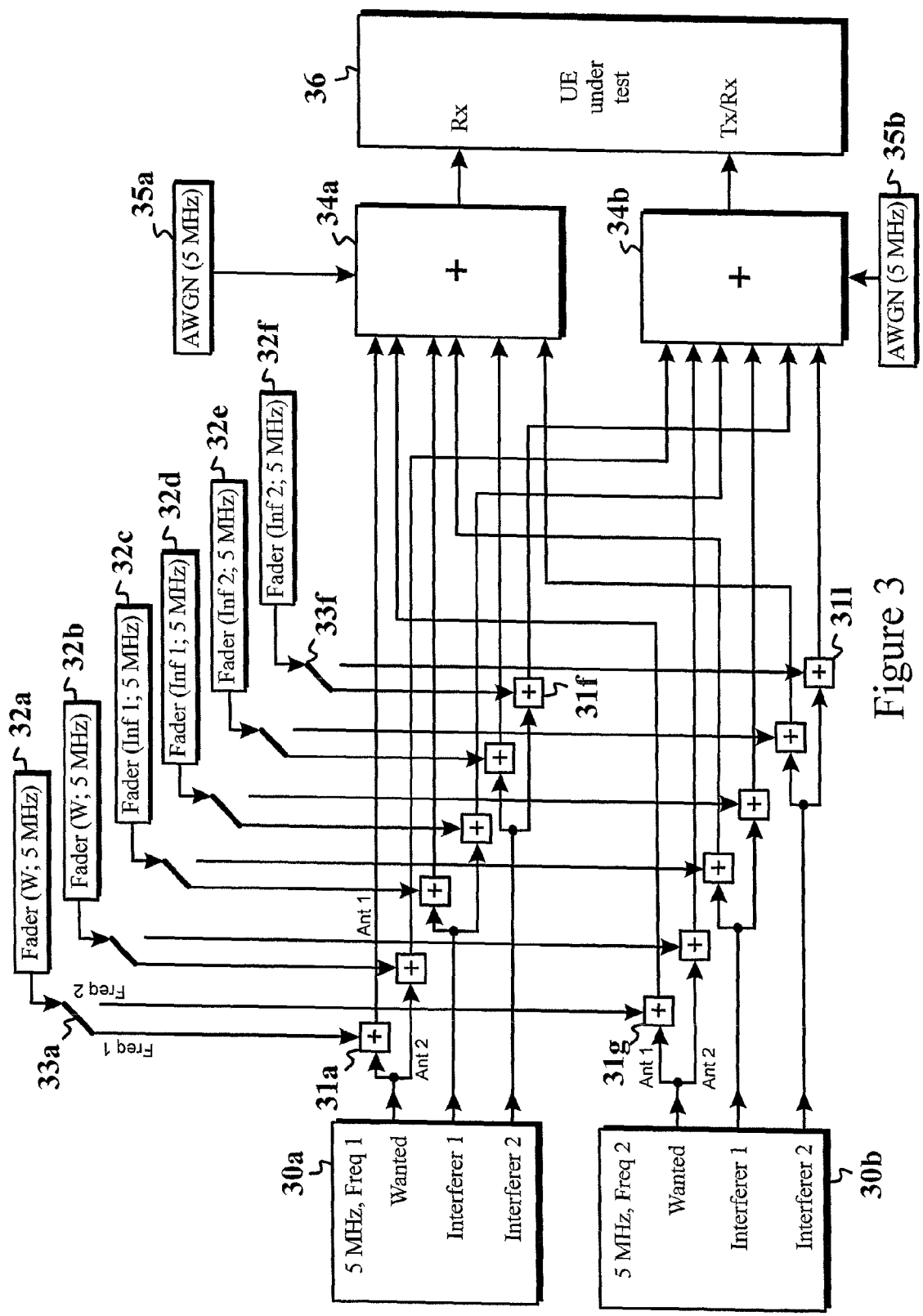
FIG. 3 is one embodiment as a block diagram, illustrating a connection diagram according to the invention for the performance test device.

At the following, the actual physical implementation of the present invention is enlightened. We now refer to FIG. 3 showing a testing system. In this embodiment of the implementation, we have a dual carrier HSDPA receiver to be tested. However, the principle can be easily extended to multicarrier receivers where the amount of used carriers is any integer above "2". Further, the principle can be extended to a multiband situation where the carriers locate in at least two non-adjacent frequency bands. In the dual carrier embodiment, transmitted signal in a wanted cell and interfering signals in two neighboring cells (Interferer 1 and Interferer 2) for the first carrier frequency "Freq 1" with the bandwidth 5 MHz are represented by TX signal source 30a. Correspondingly, three TX signal components to be fed into the testing device in the second carrier frequency "Freq 2" are represented by the TX signal source 30b.

Regardless of the amount of carriers used, the testing device comprises six radio channel emulator blocks in the single-band embodiment, in other words as seen in FIG. 3, faders 32a-32f. First two faders 32a and 32b are meant for the wanted signal W and the bandwidth of the input signal, in this example 5 MHz, defines also the frequency band where the faders operate. Correspondingly, third and fourth faders 32c and 32d operate for the first interference signal, and fifth and sixth faders 32e and 32f operate for the second interference signal. In addition of that, the faders 32a-32f can be switched according to the carrier selected for the measurement. In the time instant shown in this embodiment, the first carrier (Freq 1) is chosen for the measurement. This is shown by switches 33a-33f which are connected to have effect to signals with the first frequency only. By sum blocks 31a-31f it is simply meant that each input signal from 30a for the sum block 31a-31f propagates through the corresponding fader block 32a-32f before the faded signal is fed to either the combiner 34a or 34b. Correspondingly, sum blocks 31g-31l are not connected to any of the faders, and therefore, the input signals from source 32b are directly fed through the sum blocks 31g-31l to the following combiner block 34a or 34b. For each odd sum block 31a-31l starting from 31a, first three of the corresponding input signals are faded in the channel emulators 32a, 32c and 32e and then all six signal branches are combined in combiner 34a. The combined signal is fed to a diversity antenna port ("Rx") of the User Equipment under test 36. Correspondingly, for each even sum block 31a-31l starting from 31a, first three of the corresponding input signals are faded in the channel emulators 32b, 32d and 32f and then all six signal branches are combined in combiner 34b. The combined signal is fed to a main antenna port ("Tx/Rx") of the User Equipment under test 36. Naturally, the first combined signal from 34a can be fed to port Tx/Rx and the second combined signal from 34b to port "Rx" because regarding reception properties for this test, the antennas function similarly with each other.

As a result with such a connection, a fading channel of a first antenna branch of the receiver is independent (uncorrelated) of a fading channel of a second antenna branch of the receiver during all measurement phases.

The substantial feature already discussed above relating to the corresponding throughput measuring method, the selection of a single carrier at a time, is done with multiple switches 33a-33f. When for example the carrier "Freq 2" is chosen for the throughput measuring test, switches 33a-33f connect signals representing the second frequency (see FIG. 3; switches in vertical position) through the faders 32a-32f before directing them to Rx antenna ports through the combiners. The "Freq 1" signals are then fed through blocks 31 as unprocessed and fed to the antenna ports directly through combiners 34a-34b.

Additionally, the effect of white noise in the radio channel is modeled by adding Gaussian noise from AWGN blocks 35a and 35b to the faded and unfaded RX signals in combiners 34a-34b. In this embodiment, it is sufficient to provide white Gaussian noise in the above specified 5 MHz band only.

The UE under test 36 is thus a diversity antenna receiver with two (or more) RX antenna ports where the other (or one) of these ports is also the TX antenna port. The TX and RX directions are separated by a directional coupler (not seen in FIG. 3). The signals propagated through the radio channel emulators 32a-32f are wired according to FIG. 3, however other wiring principles are also possible keeping in mind that uncorrelated fading between the main and diversity antenna branches is required in the testing procedure.

The throughput measuring test is finally performed for the RX signals achieved in the UE under test 36. The UE 36 decodes the signals for all carriers, and it reports the ACK/NACK messages (relating to HARQ messages, see above) for each carrier respectively. For the test procedure, the testing device will collect only the ACK/NACK messages regarding the target carrier (selected by switches 33a-33f) for the performance evaluation. However, in other embodiments of the invention, the ACK/NACK confirmation messages of the HARQ messaging can be replaced by some other suitable message information which is carrier specific in a way that it is suitable for identifying the used carrier in each sent signal component.

In embodiments of the test apparatus for carrier amounts exceeding two, we may change the testing apparatus as in the following. When e.g. a four cell system is used, we may add further TX signal sources 30c and 30d (not shown in the Figure) to represent third and fourth frequencies. Corresponding sum blocks are added for these input signals and they are wired to the earlier presented channel emulators 32a-32f. Switches 33a-33f are modified so that four possible switching alternatives are made possible for switching each carrier of 30a-30d into the channels one at a time. The rest of the testing procedure remains the same as above.

In case several non-adjacent frequency bands are applied, such as for 4C-HSDPA type 3i receiver testing, an additional set of six channel emulators is needed for each additional band. Thus, in case two non-adjacent bands are applied, a total of twelve channel emulators are needed in order to enable desired fading for signals in both frequency bands.

This affects the switching phase so that when a subsequent selected carrier appears to locate in another frequency band, a second set of faders (32g-32l, not seen in the Figure) is connected to the selected carrier through sum blocks 31, and the first set of faders 32a-32f is disconnected for this testing phase.

An inevitable advantage of the solutions according to the present invention is that the amount of the faders in the testing system is independent of the number of the carriers used. In the above embodiments, the amount of needed channel emulators is six regardless of the amount of carriers available in the system. For the cases where carriers locate in different bands, at most 12 faders would be needed in the dual-band case, e.g. in applying the 4C-HSDPA operation. As a benefit, the testing apparatus and procedure according to the invention will be less complex compared to the prior art where the addition of faders in case of increasing the number of carriers was required. Complexity is reduced relatively even more when e.g. 8 carriers are available in the system because the invention always manages with 6 channel emulator blocks per a frequency band. The present invention merely requires a change for the switching blocks 33a-33f and wirings for the new carriers in case of extending the use of the testing apparatus for greater amount of carriers.

Furthermore, the testing system must take into account that the connections of the switches 33a-33f between their possible connection positions do not happen in an instant. Therefore, after the switching has been performed between two carrier signals, the testing device needs to reserve enough intermediate time for ensuring that the newly selected carrier with the faders has converged into a stable operating condition. During such a convergence period, different UE measurements (such as PCI: precoding information; CQI: channel quality indicator) for the carrier under testing cannot be performed correctly. The user may specify that the measurements are not started until the convergence period has passed. Such a time managing feature can be implemented by a clock or other suitable time managing module available e.g. in a control unit or processor of the testing device.

Furthermore, it is to be noted that the testing procedure according to the above embodiments does not require any physical or parametrical changes for the UE under test. This is a significant advantage that the testing module according to the invention is truly transparent for any User Equipment. According to that characteristic, the User Equipment cannot take any specific operation or trick for improving the performance on the target carrier for passing the test. This further makes the test more reliable and uniform over different kinds of UEs.

A further advantage of the invention is that there is no need to develop any extended channel models for the testing system. As already disclosed above, the present invention is also applicable to cases where some of the carriers are on a different band, e.g. in using DB-DC-HSDPA. The invention thus introduces reduced complexity, and better flexibility and scalability when compared to the prior art solutions.

The invention is applicable to all 3GPP releases starting from release 8, and for any future releases supporting the multicarrier operation in HSDPA. Additionally, while the above embodiments have explained the invention using merely HSDPA technology and downlink direction, the invention is also applicable to other technologies which apply multicarrier operation, and also to the uplink direction where multi-cell operation is possible (specified from release 9 onwards).

In an embodiment, the testing system and apparatus according to the invention can be implemented by at least one separate or embedded hardware module for an existing testing device.

A separate or an embedded control unit may perform the above mentioned method steps where applicable, such as for controlling connection establishing, switching and measuring phases. In an embodiment, the testing device comprises a memory, and at least one processor configured to execute applicable method steps according to the invention. Furthermore, the testing method according to the invention is implemented as one or several computer programs which are executed in the at least one processor. The computer program(s) can be stored on at least one computer readable medium such as, for example, a memory circuit, memory card, magnetic or optic disk. Some functional entities may be implemented as program modules linked to another functional entity. The functional entities may also be stored in separate memories and executed by separate processors, which communicate, for example, via a message bus or an internal network within the network node. An example of such a message bus is the Peripheral Component Interconnect (PCI) bus.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (for instance, voice, modem, and the like), wireless communications media, one or more wireless communications networks, cellular communications networks, 3 G communications networks, 4 G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A testing method, comprising:
    establishing a connection between a transmitter and a receiver with at least two carriers;
    introducing interference from at least one neighboring cell;
    selecting a previously unmeasured one of the at least two carriers for a measurement;
    measuring at least one received signal, characteristic on the selected carrier after fading caused by passing the selected carrier through a set of fading channel emulators; and
    repeating the above introducing, selecting and measuring steps until all of the at least two carriers of the established connection have been measured.

2. The testing method according to claim 1, the method further comprising selecting the at least two carriers sequentially or in a random order.

3. The testing method according to claim 1, the method further comprising emulating noise in a radio channel by adding white noise prior to the measuring step.

4. The testing method according to claim 1, the method further comprising switching to a different set of fading channel emulators for the measuring if the selected carrier is located in another frequency band.

5. The testing method according to claim 1, wherein the at least one received signal characteristic is a data throughput against a type 3$i$ receiver requirement of the 3rd Generation Partnership Project specifications.

6. The testing method according to claim 5, the method further comprising:
    outputting a test pass mark if the requirement is met for the selected carrier; or
    outputting a test failed mark if the requirement is not met for the selected carrier.

7. The testing method according to claim 6, the method further comprising:
    deeming an overall test outcome to be a pass result if test pass marks are output for all configured carriers; or
    deeming the overall test outcome to be a fail result if a test fail mark is output for any configured carrier.

8. The testing method according to claim 1, the method further comprising checking Hybrid Automatic Repeat Request (HAM messages and corresponding Acknowledgement (ACK/NACK) messages in order to identify carrier data of transmitted packets.

9. The testing method according to claim 1, the method further comprising introducing interference from two neighboring cells to the selected carrier before the measuring step.

10. The testing method according to claim 1, wherein the established connection is a multicell, multi-band High-Speed Downlink Packet Access connection.

11. A testing apparatus, comprising:
    a transmitter and a receiver configured to establish a connection with at least two carriers;
    at least one interference source configured to introduce interference from at least one neighbouring cell;
    at least one set of fading channel emulators; and
    a set of switches enabling the at least one set of fading channel emulators to be connected to a single selected carrier at a time for a measurement of at least one received signal characteristic on the selected carrier after fading;
    wherein the apparatus switches the carriers to sets of fading channel emulators for measurement of at least one received signal characteristic on the selected carrier after fading until all of the at least two carriers of the established connection have been measured.

12. The testing apparatus according to claim 11, wherein six fading channel emulators in connection with transmitted signals of the selected carrier are used during a single measurement phase.

13. The testing apparatus according to claim 11, wherein transmitted signals regarding unselected carriers are directly fed to the receiver without fading during a single measurement phase.

14. The testing apparatus according to claim 11, the testing apparatus further comprising at least one additional white Gaussian noise module to emulate the noise in the radio channel.

15. The testing apparatus according to claim 11, wherein two fading channel emulators are used for a wanted signal, two further fading channel, emulators are used for a first interference source from a first neighboring cell, and two further fading channel emulators are used for a second interference source from a second neighboring cell.

16. The testing apparatus according to claim 11, wherein a fading channel of a first antenna branch of the receiver is independent of a fading channel of a second antenna branch of the receiver during all measurement phases.

17. The testing apparatus according to claim 11, wherein the testing apparatus further comprises a control unit for controlling at least one of connection establishing, the set of switches and the measurement of the at least one received signal characteristic on the selected carrier.

18. The testing apparatus according to claim 11, wherein the testing apparatus is implemented in at least one separate or embedded hardware module usable for an existing testing device.

19. A non-transitory computer-readable medium containing a computer program comprising code configured to perform the following steps, when executed on a data-processing system:

establishing a connection between a transmitter and a receiver with at least two carriers;

introducing interference from at least one neighbouring cell;

selecting a previously unmeasured one of the at least two carriers for a measurement;

measuring at least one received signal characteristic on the selected carrier after fading caused by passing the selected carrier through a set of fading channel emulators; and repeating the above introducing, selecting and measuring steps until all of the at least two carriers of the established connection have been measured.

* * * * *

UNITED STATES PATENT AND TRADEMARK OFFICE
CERTIFICATE OF CORRECTION

PATENT NO. : 8,331,261 B2
APPLICATION NO. : 12/987277
DATED : December 11, 2012
INVENTOR(S) : Christopher P. Callender and Tao Chen It is certified that error appears in the above-identified patent and that said Letters Patent is hereby corrected as shown below:

In the Claims:

at line 11 on column 12, a part of Claim 8,

"Request (HAM messages and corresponding Acknowledgement..." should read

--Request (HARQ) messages and corresponding Acknowledgement...--.

Signed and Sealed this
Twelfth Day of March, 2013

Teresa Stanek Rea
*Acting Director of the United States Patent and Trademark Office*